United States Patent
Carman (10) Patent No.: US 9,717,224 B2
(45) Date of Patent: Aug. 1, 2017

(54) STACKABLE FISHING JUG ASSEMBLIES AND METHODS OF USE

(71) Applicant: Tiger Carman, Afton, OK (US)

(72) Inventor: Tiger Carman, Afton, OK (US)

(*) Notice: Subject to any disclaimer, the term of this patent is extended or adjusted under 35 U.S.C. 154(b) by 142 days.

(21) Appl. No.: 14/512,170

(22) Filed: Oct. 10, 2014

(65) Prior Publication Data

US 2015/0101236 A1   Apr. 16, 2015

Related U.S. Application Data (60) Provisional application No. 61/889,088, filed on Oct. 10, 2013.

(51) Int. Cl.
*A01K 89/08* (2006.01)
*A01K 97/06* (2006.01)
*A01K 93/00* (2006.01)

(52) U.S. Cl.
CPC ............ *A01K 89/081* (2015.05); *A01K 97/06* (2013.01); *A01K 93/00* (2013.01)

(58) Field of Classification Search
USPC .............. 43/4, 15, 16, 43.1, 43.11; D22/146
See application file for complete search history.

(56) References Cited

U.S. PATENT DOCUMENTS

| | | | | |
|---|---|---|---|---|
| 1,915,208 A | * | 6/1933 | Walthers | A01K 93/00 43/41 |
| 3,168,790 A | * | 2/1965 | Creasey | A01K 93/00 43/43.11 |
| 3,204,363 A | * | 9/1965 | Dunham | A01K 93/00 43/43.14 |
| 4,484,405 A | * | 11/1984 | Woods | A01K 93/00 43/1 |
| 4,574,515 A | * | 3/1986 | Garner | A01K 93/00 43/43.11 |
| 5,253,445 A | * | 10/1993 | Spoonemore | A01K 93/00 43/17 |
| 2013/0298440 A1 | * | 11/2013 | Miller | A01K 93/02 43/17 |

* cited by examiner

*Primary Examiner* — Joanne Silbermann
(74) *Attorney, Agent, or Firm* — John M. Behles (57) ABSTRACT

Embodiments of the present technology relate to stackable fishing assemblies. In on embodiment, a fishing assembly includes a first buoyant section, a second buoyant section that is spaced apart from the first buoyant section to form a groove that is configured to spool fishing line, and a tubular handle extending from the first and second buoyant sections, the tubular handle having a first end and a second end, wherein the second end is sized to mate with a second tubular handle of a second fishing assembly that is constructed substantial similar to the fishing assembly.

17 Claims, 7 Drawing Sheets

STACKABLE FISHING JUG ASSEMBLIES AND METHODS OF USE

CROSS REFERENCE TO RELATED APPLICATIONS

This application claims the priority benefit of U.S. Provisional Application Ser. No. 61/889,088, filed on Oct. 10, 2013, titled "STACKABLE FISHING JUG ASSEMBLIES AND METHODS OF USE", which is hereby incorporated by reference herein in its entirety, including all references cited therein.

FIELD OF THE PRESENT TECHNOLOGY

The present technology is directed to fishing assemblies, and more specifically, but not by way of limitation, to jug fishing assemblies that are stackable.

SUMMARY

Embodiments of the present technology include a fishing assembly, comprising: (a) a first buoyant section; (b) a second buoyant section that is spaced apart from the first buoyant section to form a groove that is configured to spool fishing line; and (c) a tubular handle extending from the first and second buoyant sections, the tubular handle having a first end and a second end, wherein the second end is sized to mate with a second tubular handle of a second fishing assembly that is constructed substantially similar to the fishing assembly.

In one embodiment, each of the first and second buoyant sections comprises an octagonal shape that defines contacting edges that releaseably receive a hook.

In another embodiment, any of the first and second buoyant sections comprises a notch that is configured to receive a weight that is attached to fishing line.

In yet another embodiment, the fishing assembly further comprises a protective film for covering the notch.

In some embodiments, the second end of the tubular handle comprises two substantially T-shaped apertures that receive fishing line and position a weight at a desired depth.

In one embodiment, the first end is smaller in diameter than the second end.

Embodiments of the present technology include a fishing assembly, comprising: (a) a first buoyant section; (b) a second buoyant section that is spaced apart from the first buoyant section to form a groove that is configured to spool fishing line; (c) a first handle extending from the first buoyant section, the first tubular handle having a first end with a first diameter; and (d) a second handle extending from the second buoyant section, the second tubular handle having a second end with a second diameter, the second diameter is larger than the first diameter of the first end, the second tubular handle extending through the first buoyant section to form a collar, and a second end of the first handle being coupled to the collar.

Embodiments of the present technology include a fishing assembly, comprising: a pair of fishing assemblies, comprising: (a) a first fishing assembly that comprises: (i) a first buoyant body with a first flange and a second flange, the first flange and the second flange being spaced apart from one another to form a groove that spools fishing line; (ii) a first handle extending from the first buoyant section, the first tubular handle having a first end with a first diameter; (iii) a second handle extending from the second buoyant section, the second tubular handle having a second end with a second diameter, the second diameter is larger than the first diameter of the first end; (b) a second fishing assembly that is substantially identical to the first fishing assembly, wherein the second fishing assembly is stacked onto the first fishing assembly such that a second end of the second fishing assembly is mated with the first handle of the first fishing assembly in such a way that the first handle of the first fishing assembly is inserted within the second end of the second fishing assembly.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive, may be omitted. It will be understood that the technology is not necessarily limited to the particular embodiments illustrated herein.

DETAILED DESCRIPTION

The present technology relates to a popular fishing technique that is commonly referred to as "jug" fishing. Jug fishing derives its name from the fact that empty plastic bottles or jugs are used as floats from which a fishing line extends into the water. The line attached to the float is attached to a weight at the end and hooks are positioned between the weight and the float. When a fish strikes a hook on the line, the movement of the jug provides an easy indication of a strike with the handle being visible above water. The handle makes the jug much easier to see, hold on to, retrieve from the water, spool the line, and stack for storage without tangling, sliding, or taking up space. A hard plastic coating may be applied to the foam to extend the life of the foam substantially.

In some embodiments, the present technology is directed to a fishing device or assembly. In accordance with the technology, a float takes the form of a plurality of flat octagonal shaped members that are each constructed of buoyant foam and a handle made of plastic tubular section of material. The flat octagonal members are made into two different sizes: two larger members and two smaller members. They are stacked in a desired order over the handle to create a groove that receives fishing line when wound around the float. The handle is made of two different size pipes cut into equal size lengths allowing for handles to nest with one another for stacking of a plurality of jugs. The handle portions are secured together with fasteners leaving a large base and smaller top attached together. The handle is located in the center of the octagonal members and provides a solid grip for retrieving the jug from the water, this will allow for spooling of the line around the float much easier. A lower portion of the jug is flat with the addition of two flat cable clips (or other securement members) on opposing sides to provide catches for the line to be set at any depth. The handle is used as a strike indicator by placing the handle face down in the water while the flat side is facing up showing the flat cable clips allowing the line to hang over the side into the water. Once a fish strikes, the jug will flip over showing the handle side up for an easy retrieval and strike indication.

Figure 1A:
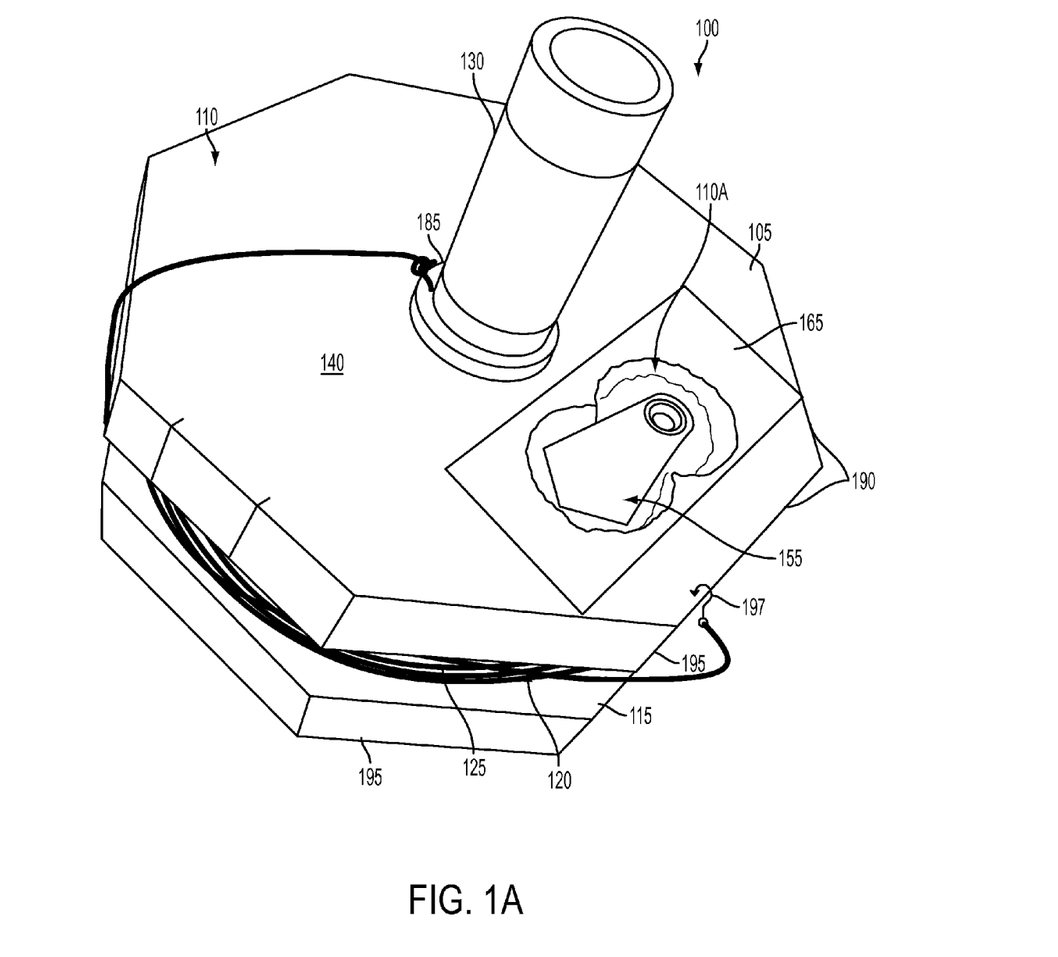
FIG. 1A is a perspective view of an example fishing assembly, constructed in accordance with the present technology.

Referring to FIG. 1A, a fishing assembly 100 of the present technology is shown as comprising a buoyant body 105 (e.g., float). The buoyant body 105 is constructed from any suitable buoyant material such as foam. In some embodiments, the buoyant body 105 is covered with a protective outer coating that prevents degradation of the foam due to exposure of the foam to the elements, as well as damage caused by ordinary use of the fishing assembly 100. The coating applied to the buoyant body 105 is reflective or colored with a conspicuous or highly visible color such as orange. Coloring of the buoyant body 105 will function to make the buoyant body 105 highly visible against natural backgrounds such as water, brush, and the like.

In one embodiment, the buoyant body 105 comprises a first buoyant section 110 and a second buoyant section 115. In some embodiments, the first buoyant section and the second buoyant sections are shaped and sized similarly to one another. For example, the first buoyant section 110 and the second buoyant section 115 can have a substantially octagonal shape. It will be appreciated that the buoyant sections can have differing shapes relative to one another. It will also be appreciated that the buoyant sections can have shapes other than octagonal such as square, triangular, rectangular, irregular, or otherwise polygonal.

Figure 1B:
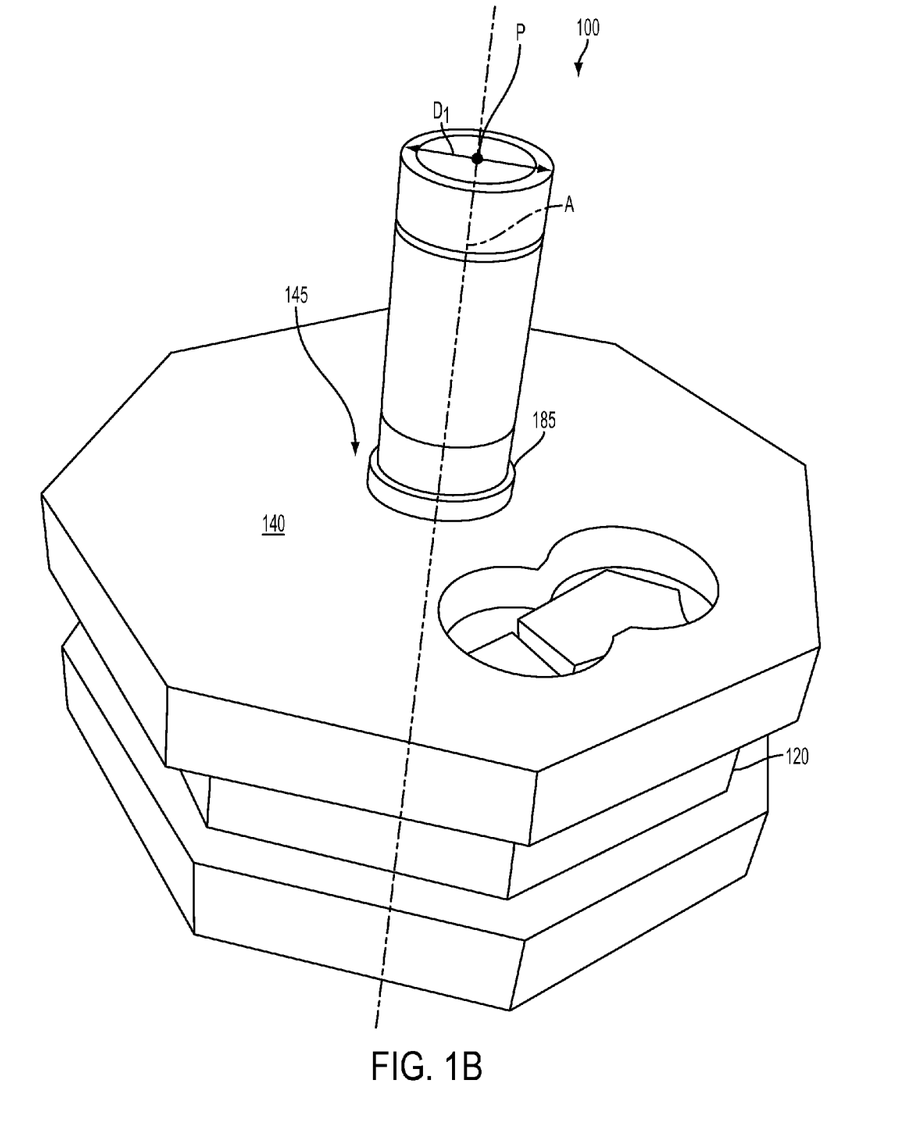
FIG. 1B is a partial perspective view of an example fishing assembly, with no fishing line.

According to some embodiments, the first buoyant section 110 and the second buoyant section 115 are spaced apart from one another to form a groove 120 that acts as a spool that receives fishing line 125 therein. In some embodiments, the groove 120 is octagonal in shape (see FIG. 1B). In another embodiment, the groove 120 has a sidewall 120A (FIG. 1C) that is rounded.

The polygonal shape of the first buoyant section 110 and the second buoyant section 115 create contacting edges that releaseably receive a hook, which is coupled to the fishing line 125. The first buoyant section 110 can have contacting edges 190 and the second buoyant section 115 can also have contacting edges 195. A hook 197 is illustrated as being inserted into one of the contacting edges 190 of the first buoyant section 110. In some embodiments, the material selected for the first buoyant section 110 and the second buoyant section 115 allows for hooks to be releaseably associated with a contact edge and removed from the contacting edge without tearing or gouging sections from the contacting edge.

In some embodiments, the first buoyant section 110 comprises a notch 110A that receives and retains a weight 155. The weight 155 is coupled to the fishing line 125. The weight 155 functions to ensure placing of the fishing assembly 100 in a deployed or pre-strike position, where a first end of a handle of the assembly is visible when the fishing assembly 100 floats on water 160 (see FIG. 1C). In one embodiment, the notch 110A is covered with a protective cover 165 that prevents the weight 155 from disassociating with (e.g., being removed from) the notch 110A.

Figure 1C:
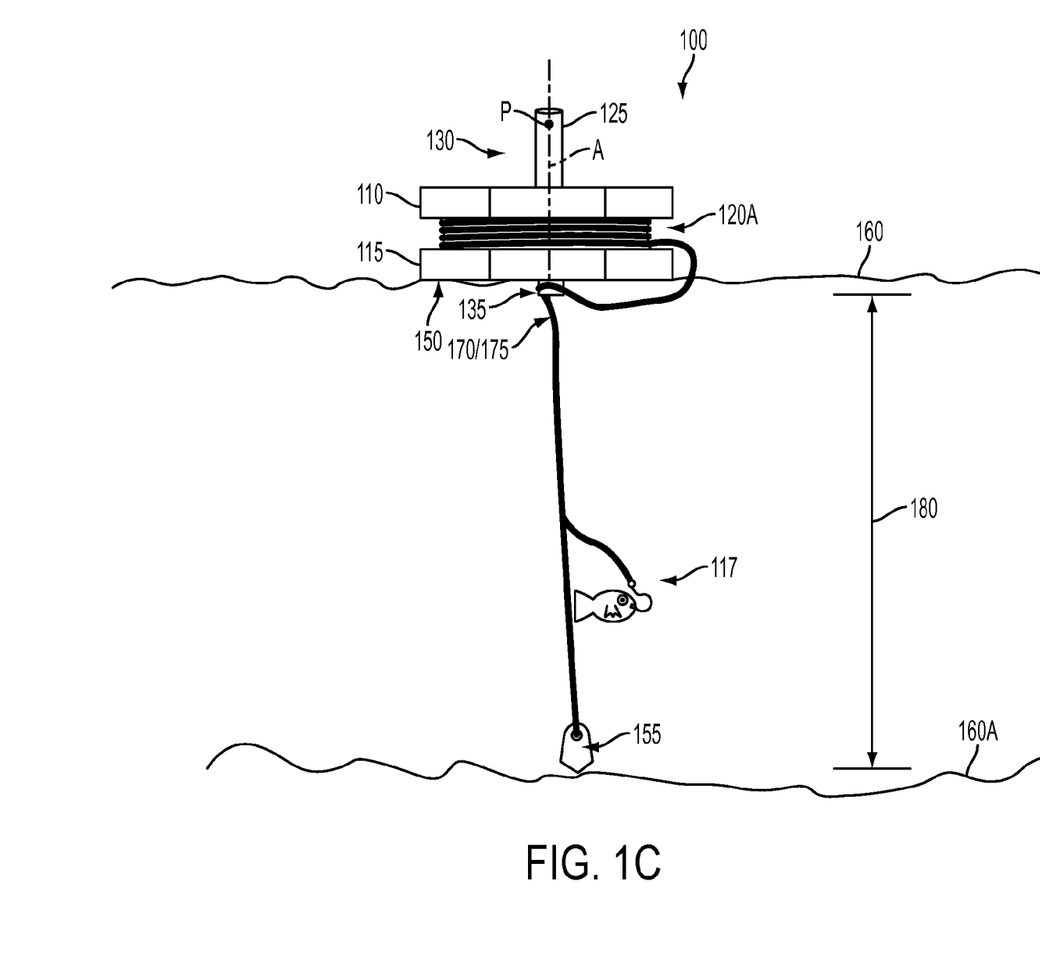
FIG. 1C is a side elevational view of an example fishing assembly, in operation, in a flagged configuration.

The fishing assembly 100 also comprises a tubular handle 125 that comprises a first end 130 and a second end 135 (FIG. 1C). In one embodiment, the first end 130 extends normally to an upper surface 140 of the first buoyant section 110. In one embodiment, the first end 130 is a cylinder that has a first diameter D1. In some embodiments, the first end 130 is inserted into an aperture 145 (FIG. 1B) that extends through the buoyant body 105. The first end 130 is secured inside the aperture 145 by an adhesive or other fastening means.

The second end 135 (FIG. 1C) extends normally from a lower surface 150 of the second buoyant section 115. The second end 135 may also extend in linear alignment with a handle axis A that extends through a center point P of the first end 130.

Figure 1D:
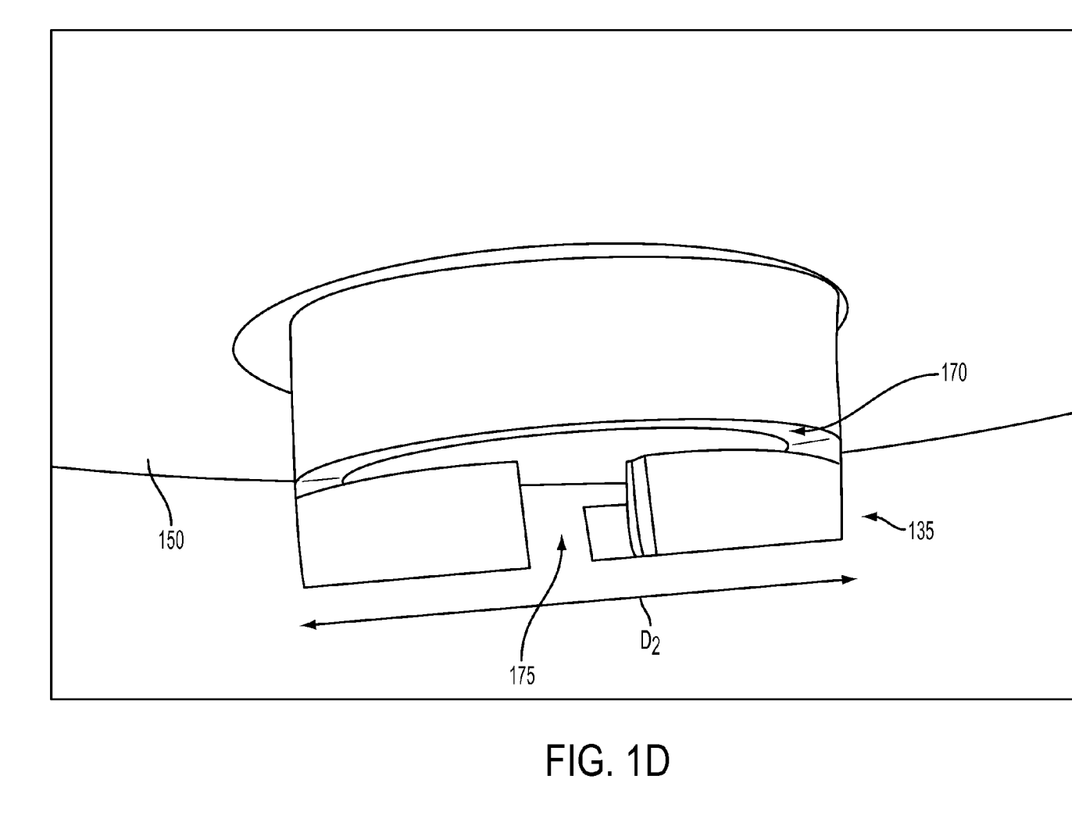
FIG. 1D is a perspective view of a second portion of a handle of a fishing assembly.

In some embodiments, the second end 135 comprises a second diameter D2 (FIG. 1D). The second diameter D2 of the second end 135 is larger than the first diameter D1 of the first end 130 so as to allow a first end of one fishing assembly to be inserted into the second end of a second fishing assembly (see FIG. 2), allowing two or more fishing assemblies to be placed in a stacked configuration.

In one embodiment, the second end 135 is provided with two substantially T-shaped grooves 170 and 175. These grooves 170 and 175 are positioned on opposing sides of the second end 135. The grooves 170 and 175 function to provide a catch. A user can wind a portion of the fishing line 125 through the grooves 170 and 175 to select an operational depth 180 (FIG. 1C) for the fishing assembly 100.

In some embodiments, the operational depth 180 is a distance measured from approximately the second end 135 to the weight 155, when the fishing assembly 100 is deployed into the water 160.

According to some embodiments, the second end 135 extends through both the first buoyant section 110 and the second buoyant section 115 such that a portion 185 of the second end 135 extends from the upper surface 140 of the first buoyant section 110 to form a collar. The first end 130 is inserted within and secured inside the collar.

In some embodiments, the first end 130 and the second end 135 are formed as an integrated or monolithic member, referred to generally as a tubular handle. It will be understood that the first and second ends 130 and 135 can have shapes other than cylindrical, such as square, hexagonal, triangular, or another shape so long as a first end 130 of a first fishing assembly is sized for insertion into a second end of a second fishing assembly so that the first and second fishing assemblies can be placed in stacked (e.g., mating) configuration.

In operation, the fishing line 125 is connected to the first end 130 proximate the collar of the second end 135, where the first end 130 meets the upper surface 140 of the first buoyant section 110. The fishing line 125 is looped around the groove 120. Hooks, such as hook 197 extend from the fishing line 125. As the fishing line 125 is looped around the groove 120, hooks are secured to either the contacting edges 190 of the first buoyant section 110 or the contacting edges 195 of the second buoyant section 115. While only two contacting edges 190 and two contacting edges 195 are show in FIG. 1A, it will be understood that each edge of the octagonal first and second buoyant sections 110 and 115 are contacting edges.

The plurality of hooks is located at a different position along the fishing line 125. As the fishing line 125 is spooled into the groove 120 and a hook is encountered, the hook is placed into one of the contacting edges.

Referring back to FIG. 1A, once the fishing line 125 is spooled completely into the groove 120, the weight 155 is placed into the notch 110A of the first buoyant section 110.

To deploy the fishing assembly 100 in the water 160, the weight 155 is removed from the notch 110A and placed into the water 160. The fishing line 125 is unspooled from the groove 120, which requires removal of the hooks from the contacting edges as the fishing line 125 is unspooled.

For example, when the weight 155 contacts a bottom surface 160A (e.g., such as a bottom of a lake or other body of water), unspooling of the fishing line 125 is terminated and the fishing line 125 is wrapped into the two substantially T-shaped grooves 170 and 175 of the second end 135 to define the operational depth 180.

Figure 1E:
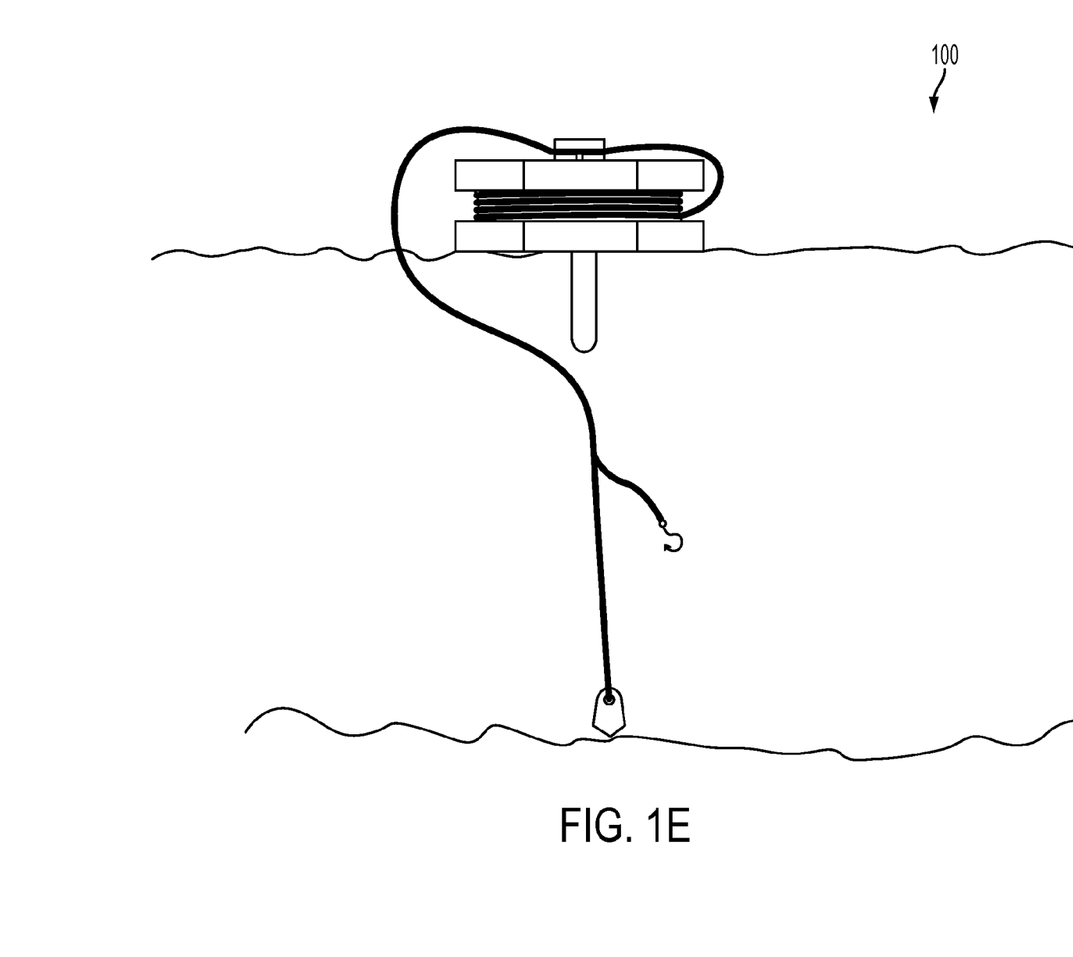
FIG. 1E is a side elevational view of an example fishing assembly, in operation, in an un-flagged configuration.

When a fish is caught on one of the hooks, the force of the fish pulling on the fishing assembly 100 will, in some instances, cause the fishing device 100 to flip over to a flagged position, illustrated in FIG. 1C. FIG. 1E illustrates a fishing assembly 100 in an un-flagged position.

If the operational depth 180 is less than a length of the fishing line 125, the fishing assembly 100 will float on the water 160 in a pre-strike (e.g., unflagged) position.

In another example, if the depth of the water 160 is greater than the length of the fishing line 125, the fishing assembly 100 will float on the water in the flagged position, regardless of whether a fish has been caught on one of the hooks or not.

Figure 2:
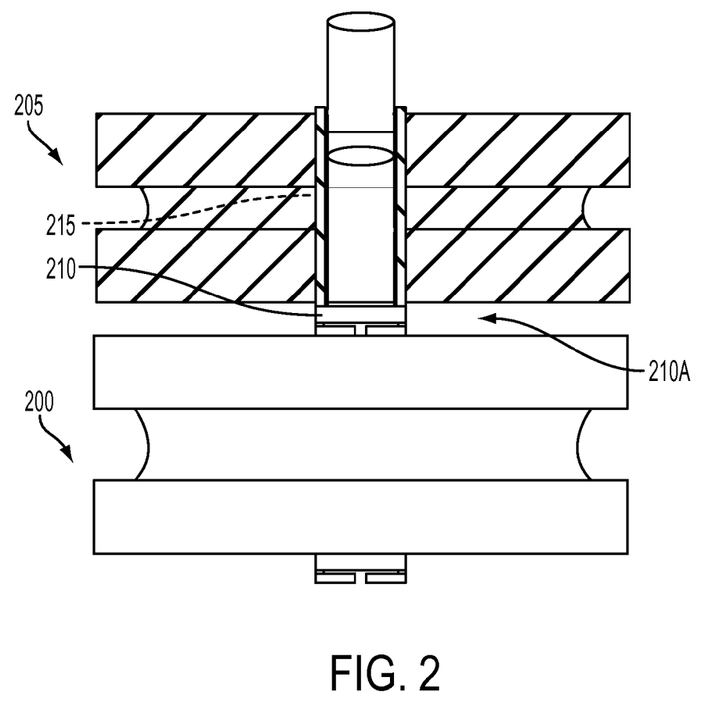
FIG. 2 is a cross sectional view of two fishing assemblies, illustrated in a stacked configuration.

FIG. 2 illustrates a pair of fishing assemblies disposed in a stacked configuration. A first fishing assembly 200 is constructed similarly to the fishing assembly 100 of FIGS. 1A-E, described in greater detail supra. The second fishing assembly 205 is substantially identical in construction to the first fishing assembly 200. The second fishing assembly 205 is stacked onto the first fishing assembly 200 such that a second end 210 of a handle 210A of the second fishing assembly 205 is mated with the first handle 215 of the first fishing assembly 200. The first handle 215 of the first fishing assembly 200 is inserted within the second end 210 of the second fishing assembly 205. Additional fishing assemblies can be stacked with and below the first fishing assembly 200 or stacked on top of the second fishing assembly 205.

Figure 3:
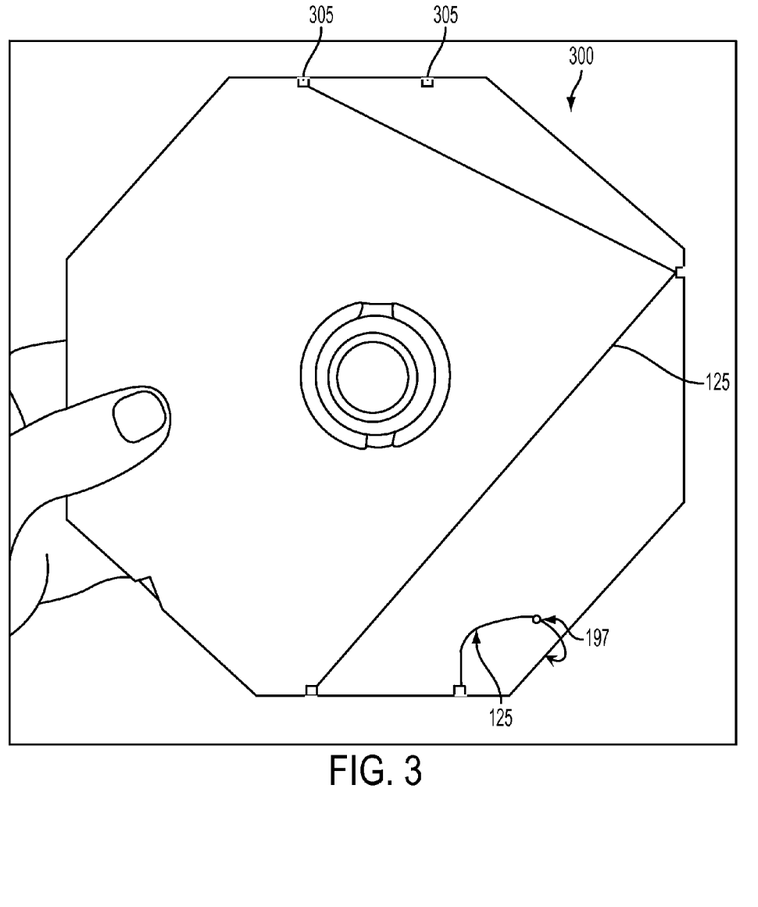
FIG. 3 is a bottom plan view of an example fishing assembly, illustrating notches in a buoyant member for holding fishing line or hooks.

Referring now back to FIG. 3, which illustrates a fishing assembly 300 that is constructed similarly to the fishing assembly 100 of FIGS. 1A-E, with the exception that the contacting edges 190 of the first buoyant section 110 are provided with a plurality of slits 305. Each of the plurality of slits 305 is configured to receive either the fishing line 125 or a hook 197 therein. For example, a final section of the fishing line 125 can be threaded through one of the slits 305 before the weight 155 is placed into the notch 110A.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A fishing assembly, comprising:
a first buoyant section;
a second buoyant section that is spaced apart from the first buoyant section to form a groove that is configured to spool fishing line; and
a tubular handle extending from the first and second buoyant sections, the tubular handle having a first end and a second end, wherein the second end is sized to mate with a second tubular handle of a second fishing assembly that is constructed substantial similar to the fishing assembly, further wherein the second end of the tubular handle extends through both the second buoyant section and the first buoyant section such that a portion of the second end extends above a flat upper surface of the first section to form a collar, wherein the first end is inserted securely inserted within the collar, the first end being smaller in diameter than the second end such that the first end can be inserted into the second tubular handle of the second fishing assembly.

2. The fishing assembly according to claim 1, wherein each of the first and second buoyant sections comprises an octagonal shape that defines contacting edges that releaseably receive a hook.

3. The fishing assembly according to claim 1, wherein any of the first and second buoyant sections comprises a notch that is configured to receive a weight that is attached to fishing line.

4. The fishing assembly according to claim 3, further comprising a protective cover for covering the notch.

5. The fishing assembly according to claim 4, wherein the second end of the tubular handle comprises two T-shaped apertures that receive fishing line and position a weight at a desired depth.

6. The fishing assembly according to claim 1, wherein the first end is smaller in diameter than the second end.

7. A fishing assembly, comprising:
a first buoyant section;
a second buoyant section that is spaced apart from the first buoyant section to form a groove that is configured to spool fishing line;
a first tubular handle extending from the first buoyant section, the first tubular handle having a first end with a first diameter; and
a second tubular handle extending from the second buoyant section, the second tubular handle having a second end with a second diameter, the second diameter is larger than the first diameter of the first end, the second tubular handle extending through the second buoyant section and the first buoyant section to form a collar, a second end of the first handle being coupled to the collar.

8. The fishing assembly according to claim 7, wherein at least a portion of the second handle extends through the second buoyant section and into the first buoyant section.

9. The fishing assembly according to claim 8, wherein any of the first and second buoyant sections comprises a notch that is configured to receive a weight that is attached to fishing line.

10. The fishing assembly according to claim 9, further comprising a protective cover for covering the notch.

11. The fishing assembly according to claim 10, wherein the second end of the tubular handle comprises two T-shaped apertures that receive fishing line and position a weight at a desired depth.

12. A pair of fishing assemblies, comprising:
a first fishing assembly that comprises:
a first buoyant body with a first flange and a second flange, the first flange and the second flange being spaced apart from one another to form a groove that spools fishing line;

a first tubular handle extending from the first buoyant body, the first tubular handle having a first end with a first diameter;

a second tubular handle extending from the second buoyant body, the second tubular handle having a second end with a second diameter, the second diameter is larger than the first diameter of the first end; and a second fishing assembly that is identical to the first fishing assembly, wherein the second fishing assembly is stacked onto the first fishing assembly such that a second end of the second fishing assembly is mated with the first handle of the first fishing assembly in such a way that the first handle of the first fishing assembly is inserted within the second end of the second fishing assembly.

13. The pair of fishing assemblies according to claim 12, wherein each of the first and second buoyant sections comprises an octagonal shape that defines contacting edges that releaseably receive a hook.

14. The pair of fishing assemblies according to claim 12, wherein any of the first and second buoyant sections comprises a notch that is configured to receive a weight that is attached to fishing line.

15. The pair of fishing assemblies according to claim 14, further comprising a protective cover for covering the notch.

16. The pair of fishing assemblies according to claim 12, wherein the second end of the tubular handle comprises two T-shaped apertures that receive fishing line and position a weight at a desired depth.

17. The pair of fishing assemblies according to claim 12, wherein the first end is smaller in diameter than the second end.

\* \* \* \* \*